United States Patent
Chen et al.

(10) Patent No.: US 10,402,680 B2
(45) Date of Patent: Sep. 3, 2019

(54) METHODS AND APPARATUS FOR IMAGE SALIENT OBJECT DETECTION

(71) Applicant: BEIHANG UNIVERSITY, Beijing (CN)

(72) Inventors: Xiaowu Chen, Beijing (CN); Anlin Zheng, Beijing (CN); Jia Li, Beijing (CN); Qinping Zhao, Beijing (CN); Feng Lu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 78 days.

(21) Appl. No.: 15/683,715

(22) Filed: Aug. 22, 2017

(65) Prior Publication Data

US 2018/0285683 A1 Oct. 4, 2018

(30) Foreign Application Priority Data

Mar. 30, 2017 (CN) .......................... 2017 1 0204188

(51) Int. Cl.
*G06K 9/46* (2006.01)
*G06T 3/40* (2006.01)
(Continued)

(52) U.S. Cl.
CPC ....... *G06K 9/4671* (2013.01); *G06K 9/00597* (2013.01); *G06K 9/42* (2013.01); *G06K 9/4685* (2013.01); *G06K 9/52* (2013.01); *G06T 3/4007* (2013.01); *G06T 7/11* (2017.01); *G06T 7/143* (2017.01); *G06T 7/194* (2017.01);
(Continued)

(58) Field of Classification Search
CPC .............. G06K 9/4671; G06K 9/4685; G06K 9/00597; G06K 9/52; G06K 9/42; G06T 3/4007; G06T 7/11; G06T 7/194; G06T 2207/20076; G06T 2207/10024; G06T 2207/20104
See application file for complete search history.

(56) References Cited

U.S. PATENT DOCUMENTS

2009/0175535 A1* 7/2009 Mattox ................ G06K 9/3241
382/164
2013/0314441 A1* 11/2013 Grasset ..................... G06T 1/00
345/633
(Continued)

*Primary Examiner* — Qian Yang
(74) *Attorney, Agent, or Firm* — J.C. Patents

(57) ABSTRACT

A method and an apparatus for extracting a saliency map are provided in the embodiment of the present application, the method includes: conducting first convolution processing, first pooling processing and normalization processing on an original image via a prediction model to obtain eye fixation information from the original image, where the eye fixation information is used for indicating a region at which human eye gaze; conducting second convolution processing and second pooling processing on the original image via the prediction model to obtain semantic description information from the original image; fusing the eye fixation information and the semantic description information via element-wise summation function; and conducting detection processing on the fused eye fixation information and semantic description information via the prediction model to obtain a saliency map from the original image. It is used for improving the efficiency of extracting the saliency map from image.

10 Claims, 6 Drawing Sheets

(51) Int. Cl.
*G06T 7/11* (2017.01)
*G06T 7/194* (2017.01)
*G06K 9/42* (2006.01)
*G06K 9/52* (2006.01)
*G06K 9/00* (2006.01)
*G06T 7/143* (2017.01)

(52) U.S. Cl.
CPC .............. *G06T 2207/10024* (2013.01); *G06T 2207/20076* (2013.01); *G06T 2207/20081* (2013.01); *G06T 2207/20084* (2013.01); *G06T 2207/20104* (2013.01)

(56) References Cited

U.S. PATENT DOCUMENTS

| | | | | |
|---|---|---|---|---|
| 2013/0342758 | A1* | 12/2013 | Greisen | G06T 3/0012 348/441 |
| 2017/0270653 | A1* | 9/2017 | Garnavi | G06T 7/0002 |
| 2017/0308770 | A1* | 10/2017 | Jetley | G06K 9/4671 |
| 2017/0345130 | A1* | 11/2017 | Wang | G06T 3/4046 |

* cited by examiner

METHODS AND APPARATUS FOR IMAGE SALIENT OBJECT DETECTION

CROSS-REFERENCE TO RELATED APPLICATION

This application claims priority to Chinese Patent Application No. 201710204188.5, filed on Mar. 30, 2017, which is hereby incorporated by reference in its entirety.

TECHNICAL FIELD

Embodiments of the present application relate to the technical field of computer vision, in particular to a method and an apparatus for extracting a significant image.

BACKGROUND

An image is comprised of foreground and background, and the foreground is usually a salient region of the image. In practical application process, the significant region which is also called salient region or salient object formally should be extracted from the image.

At present, many applications usually take advantage of the pixels' RGB value and its position to extract salient objects from an image which always introduced mistakes into the result. We just take one method as example. Firstly, a given image is segmented into superpixels which are then taken as input to the pre-trained convolutional neural network to extract feature for each superpixel. Secondly, a fully connected neural network is proposed to score each superpixel by virtue of the extracted features. Finally, a salient object can be popped out from the given image by virtue of merging the scored superpixels. In the above process, it takes a lot of time to segment the original image, and also takes lots of time to process each superpixel, which leads to the low efficacy of extracting salient object from original image.

SUMMARY

Embodiments of the present application provided a method and an apparatus for extracting saliency map from an image are provided, which improve the efficiency of extracting the saliency map.

In a first aspect, a method for extracting saliency map is provided in the embodiments of the present application, including:

Conducting first convolution processing, first pooling processing and normalization processing on an original image via a prediction model to obtain eye fixation information from the original image;

Conducting second convolution processing and second pooling processing on the original image via the prediction model to obtain semantic description information from the original image, where the semantic description information is used for describing content of the original image;

Fusing the eye fixation information and the semantic description information via element-wise summation function; and Conducting detection processing on the fused eye fixation information and semantic description information via the prediction model to obtain a saliency map from the original image. Where the fused eye fixation information and semantic description information can be processed by a series of convolution operations. Each of the convolution operations is followed by an activation operation.

In another possible embodiment, where after the conducting detection processing on the eye fixation information and the semantic information via the prediction model to obtain the saliency map from the original image, the method further includes:

Conducting scaling processing on the saliency map via bilinear interpolation to make a size of the saliency map is the same as a size of the original image; and Conducting filtering processing on the saliency map via a Butterworth filter.

In another possible embodiment, where prior to the conducting the first convolution processing, the first pooling processing and the normalization processing on the original image via prediction model to obtain the eye fixation information from the original image, the method further includes:

Obtaining a plurality of sample RGB images and a manually annotated saliency map corresponding to each of the sample RGB images;

Determining a plurality of processing functions which are executed in a preset order, where the processing functions include convolution functions, pooling functions, normalization functions and activation functions;

Initializing each of the processing functions according to preset initial parameters;

Optimizing the preset initial parameters in the processing functions via the sample RGB images and each of the manually annotated saliency map to obtain optimal parameter for each of the processing functions; and Determining the prediction model according to each of the processing functions and the optimal parameter in each of the processing functions.

In another possible embodiment, where the optimizing the preset initial parameters of each of the processing functions via the sample RGB images and each of the manually annotated saliency map to obtain the optimal parameter of each of the processing functions includes:

Processing each of the sample RGB images via the plurality of processing functions successively according to the preset order;

Calculating loss value between a predicted saliency map corresponding to the sample RGB and the manually annotated saliency map corresponding to the sample RGB images via a loss function;

Calculating a partial derivative with reference to the loss function according to the loss value to obtain a gradient value from the loss function; and Processing the gradient value via the plurality of processing functions successively to obtain the optimal parameter of each of the processing functions.

In a second aspect, an apparatus for extracting saliency map is provided in the embodiments of the present application, including a first extraction module, a second extraction module, a fusing module and a detection module, where, The first extraction module which is also call eye fixation information extraction module is configured to conduct first convolution processing, first pooling processing and normalization processing on an original image via a prediction model to obtain eye fixation information of the original image;

The second extraction module which is also call semantic information extraction module is configured to conduct second convolution processing and second pooling processing on the original image via the prediction module to obtain semantic description information from the original image;

The fusing module is configured to fuse the eye fixation information and the semantic description information via element-wise summation function; and The detection module is configured to conduct detection processing on the fused eye fixation information and semantic description information to obtain saliency map from the original image. The detection module consists of convolution operations, activation functions and element-wise summation operations. Each of the convolution operations is followed by an activation function.

In another possible embodiment, the apparatus further includes a scaling processing module and a filtering module, where, The scaling processing module is configured to conduct scaling processing on the saliency map via bilinear interpolation to make a size of the saliency map is the same as a size of the original image, after the detection module conducts detection processing on the fused eye fixation information and semantic information; and The filtering module is configured to conduct filtering processing on the saliency map via a Butterworth filter.

In another possible embodiment, the apparatus further includes an obtaining module, a first determination module, a second determination module, an initialization module and an optimizing module where, The obtaining module is configured to obtain a plurality of sample RGB images and a manually annotated saliency map corresponding to each of the sample RGB images, prior to the first extraction module conducting the first convolution processing, the first pooling processing and the normalization processing on the original image to obtain eye fixation information of the original image;

The first determination module is configured to determine a plurality of processing functions for the eye fixation information extraction module and semantic information extraction module. These function are executed in a preset order, where the processing functions include convolution functions, pooling functions and normalization functions as well as activation functions;

The second determined module is configured to determine the a plurality of processing functions for the detection module, where the processing function include convolution functions and activation functions as well as element-wise summation functions.

The initialization module is configured to initialize each of the processing functions according to preset initial parameters;

The optimizing module is configured to optimize the preset initial parameter in each of the processing functions via the sample RGB images and each of the manually annotated images in order to obtain optimal parameter for each of the processing functions; and In another possible embodiment, where the optimizing module is specifically configured to:

Process each of the sample RGB images via the plurality of processing functions successively according to the preset order;

Calculate loss value between a predicted saliency map corresponding to the sample RGB and the manually annotated saliency map corresponding to the sample RGB images via a loss function;

Calculate a partial derivative with reference to the loss function according to the loss value to obtain a gradient value from the loss function; and Process each of the gradient value via the plurality of processing functions successively to obtain the optimal parameter for each of the processing functions.

The method and the apparatus for extracting the saliency map provided by the embodiments of the present application, when it is needed to extract a saliency map from the original image, the eye fixation information and semantic description information of the original image are extracted via the prediction model, where the eye fixation information is used for indicating the region at which human eye gaze in the original image and the semantic description information is used for describing the content of the original image, the eye fixation information and the semantic description information are fused via element-wise summation function, and the apparatus for extracting the saliency map can determine the saliency map in the original image according to the fused eye fixation information and semantic description information. Neither other steps like segmenting image nor errors occurred in the process of dealing with segmented image blocks would be introduced into the device. Thus, the efficacy of salient object detection can be improved significantly.

BRIEF DESCRIPTION OF DRAWINGS

To describe technical solutions in embodiments of the present application or the prior art more clearly, the following briefly describes the accompanying drawings required in the description of embodiments or the prior art, apparently, the accompanying drawings illustrate only some embodiments of the present application, and those ordinary skilled in the art can derive other drawings from these drawings without creative efforts.

DESCRIPTION OF EMBODIMENTS

In order to illustrate the objects, technical solutions and advantages of the present application more clearly, embodiments of the present application are described in further details with reference to the accompanying drawings. Obviously, the embodiments described are only some exemplary embodiments of the present application, not all embodiments. Other embodiments derived by those skilled in the art on the basis of the embodiments herein without any creative effort fall within the protection scope of the present application.

Figure 1:
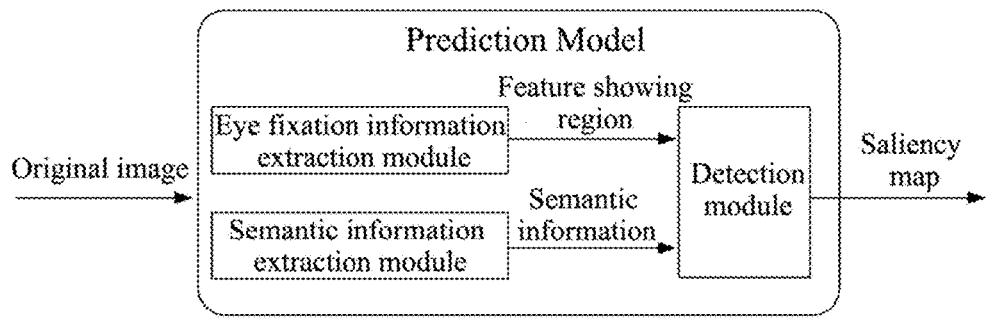
FIG. 1 is a schematic diagram of an application scenario for a method for extracting a saliency map according to an embodiment of the present application.

FIG. 1 is a schematic diagram of an application scenario for a method for extracting a saliency map according to an embodiment of the present application. See FIG. 1, a prediction model consists of an eye fixation information extraction module, a semantic information extraction module and a detection module. When it is needed to extract the saliency map in the original image, the original image is taken as input to the prediction model, the eye fixation information extraction module is used to process the original image so as to obtain eye fixation information from the original image, and then propagate the eye fixation information to detection module; the semantic information extraction module is used to process the original image, extract and obtain semantic information of the original image, and propagate the semantic information to the detection module; after the eye fixation information and the semantic information are received by the detection module, the eye fixation information and the semantic information are fused via element-wise summation and then process by a series of convolution functions and activation functions so as to obtain saliency map from the original image and output the initial saliency map.

In the present application, the process of extracting the saliency map and eye-fixation information as well as semantic segmentation from the original image can be conducted via an end-to-end system. It is unnecessary to segment the original image into image blocks and process each one of them separately. Therefore, the efficiency of detecting salient object in an image can be improved.

The technical solution of the present application is illustrated in detail via specific embodiments hereafter. It should be illustrated that, the following specific embodiments can be combined with each other, for the same or similar contents, it will not be repeated in different embodiments.

Figure 2:
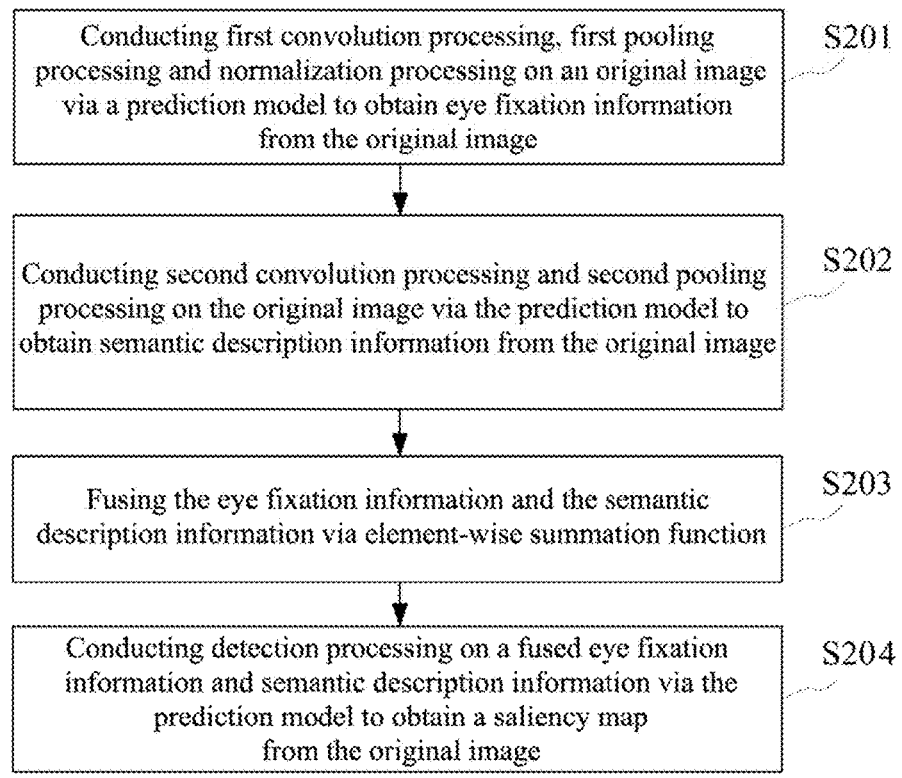
FIG. 2 is a flow chart of a method for extracting a saliency map according to an embodiment of the present application.

FIG. 2 is a flow chart of a method for extracting a saliency map according to an embodiment of the present application. See FIG. 2, the method may include:

S201, conducting first convolution processing, first pooling processing and normalization processing on an original image via eye fixation extraction module to obtain eye fixation information from the original image.

The executive agent of the embodiment of the present application is an apparatus for extracting a saliency map. Optionally, the apparatus for extracting a saliency map can be implemented by software and/or hardware.

The prediction model as depicted in the embodiment of the present application is obtained by training sample data. In the embodiment depicted in FIG. 4, the training process of the prediction model and the structure of the prediction model are illustrated in detail, not here.

Optionally, the eye fixation information from the original image is a region at which human eye gaze in the original image.

Optionally, the first convolution processing depicted in the embodiment of the present application refers to conducting a series of convolution operations on the original image by a plurality of identical or different convolution functions. Optionally, each of the convolution function is followed by an activation function. The first pooling processing refers to conducting at least one pooling processing on the original image.

For example, the original image can be processed by the following multiple functions to obtain the eye fixation information from the original image: a convolution function 1, an activation function, a normalization function, a pooling function 1, a convolution function 2, an activation function, a pooling function 2, a convolution function 3, an activation function, a convolution function 4, an activation function, a convolution function 5, an activation function, a convolution function 6, an activation function, a convolution function 7, an activation function, a convolution function 8, an activation function, a convolution function 9, and an activation function. Where, the convolution function 1 to 9 can be the same or different; and the pooling function 1 and the pooling function 2 can be the same or different.

S202, conducting second convolution processing and second pooling processing on the original image via the semantic information extraction module to obtain semantic description information from the original image.

Optionally, the semantic description information includes description information to depict the content in the original image.

Optionally, the second convolution processing depicted in the embodiment of the present application refers to conducting a series of convolution operation on the original image by a plurality of identical or different convolution functions. Optionally, each convolution operation is follow by one activation operation. The second pooling processing refers to conducting at least one pooling processing on the original image.

For example, the original image can be processed by the following multiple functions to obtain the semantic description information from the original image: a convolution function 1-1, an activation function, a convolution function 1-2, an activation function, a pooling function 1, a convolution function 2-1, an activation function, a convolution function 2-2, an activation function, a pooling function 2, a convolution function 3-1, an activation function, a convolution function 3-2, an activation function, a convolution function 3-3, an activation function, a pooling function 3, a convolution function 4-1, an activation function, a convolution function 4-2, an activation function, a convolution function 4-3, an activation function, a convolution function 5-1, an activation function, a convolution function 5-2, an activation function, a convolution function 5-3, an activation function, a convolution function 6, an activation function, a convolution function 7, an activation function, and a convolution function 8. Where, the convolution function 1 to 8 can be the same or different; and the pooling function 1 and the pooling function 2 can be the same or different.

S203, fusing the eye fixation information and the semantic description information via element-wise summation function. For example, the element-wise summation can be depicted as relationship 1:

$$F_i = X_i + Y_i \quad \text{relationship 1;}$$

Where, $F_i$ is the element which is indexed by i in the fused eye fixation and the semantic description information F, $X_i$ is the element indexed by i in the eye fixation information X, $Y_i$ is the element indexed by i in the semantic description information Y.

The index i is the same value in F and X as well as Y.

S204, conducting detection processing on a fused eye fixation information and semantic description information via the prediction module to obtain a saliency map from the original image.

Optionally, the prediction module consists of an element-wise summation function, a detection module1-1, a detection module 1-2, an element-wise summation function, detection module2, an element-wise summation function, a convolution function, an activation function, a deconvolution function and an activation function.

Optionally, the detection module consists of a plurality of identical or different convolution functions: a convolution function A, a convolution function B followed by a convolution function C, a convolution function D followed by a convolution function E and then which followed by a convolution function F. Each of the convolution functions is followed by an activation function.

In order to speed up the extraction of saliency map from the original image, optionally, prior to conducting the processing on the original image, the original image can be conducted scaling processing firstly to scale the size of the original image to a preset size, for example, the preset size can be 280 pixels*280 pixels. A value of each pixel in the original image should be subtracted from a mean value which is computed on overall training data pixel-wisely.

In the practical application process, optionally, after the saliency map corresponding to the original image is obtained, the size of saliency map is scale to be the same size of the original image via bilinear interpolation and then a Butterworth filter is applied on it for post-processing so as to refine the final result. For example, the Butterworth filter can be depicted as relationship 2:

$$B(x) = 1 - \frac{1}{1 + \left(\frac{x}{x_0}\right)^{2M}};  \quad \text{relationship 2}$$

Where, $x_0$ represents a truncation frequency, and M represents an order of the filter. The Butterworth filter can make the frequency response curve in the passband maximally flat without fluctuation and the stopband gradually decrease to zero. For example, $x_0$ can be set to 0.4, and M can be set to 3.

The method for extracting the saliency map provided in the embodiment of the present application, when it is needed to extract the saliency map from the original image, the eye fixation information and the semantic description information from the original image are obtained via the eye fixation information extraction module and semantic information extract module, respectively. Where the eye fixation information is used for indicating the region at which human eye gaze and the semantic description information is used for describing the content in the original image, and the apparatus for extracting the saliency map can determine the saliency map from the original image according to the obtained eye fixation information and semantic description information. There is no need to segment the original image and even deal with each of the segmented image blocks, thus the efficiency of detecting salient object from image is improved.

Figure 3:
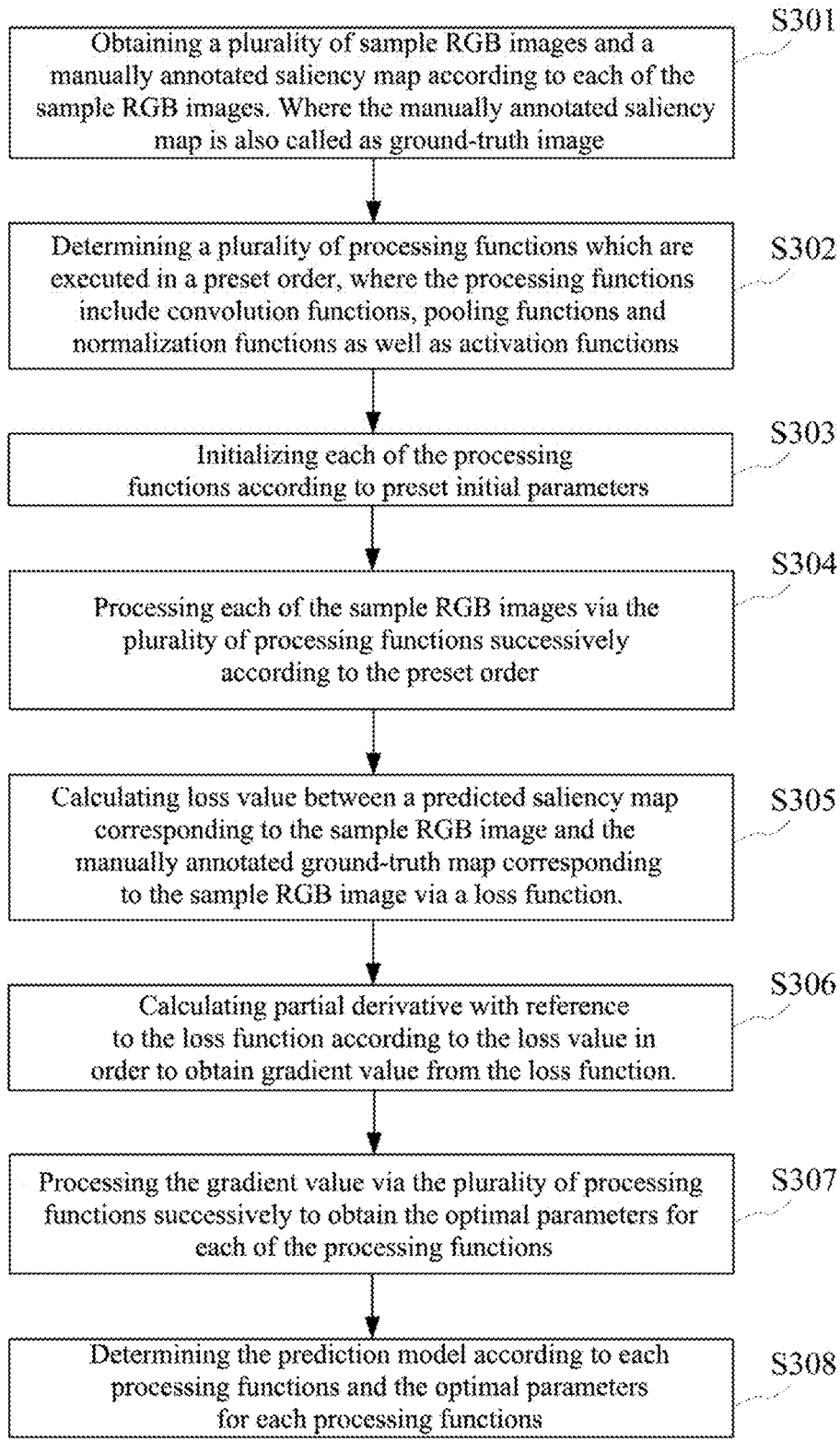
FIG. 3 is a flow chart of a method for determining a prediction model according to an embodiment of the present application.

On the basis of the embodiment depicted in FIG. 2, the following process to optimize the parameter in the prediction model is illustrated in detail in the embodiment depicted in FIG. 3.

FIG. 3 is a flow diagram of a method for optimizing the parameters of a prediction model according to an embodiment of the present application. See FIG. 3, the method may include:

S301, obtaining a plurality of sample RGB images and a manually annotated saliency map corresponding to each of the sample RGB images. Where the manually annotated saliency map is also called ground-truth image.

In the practical application process, optionally, ten thousand RGB images can be selected first, and the manually annotated saliency map of each of the RGB images is obtained by hand. In order to increase the sample images, the ten thousand RGB images and the manually annotated saliency map corresponding to each of the RGB images can be flipped horizontally respectively so as to obtain more RGB images and more manually annotated saliency maps.

S302, determining a plurality of processing functions which are executed in a preset order, where the processing functions include convolution functions, pooling functions and normalization functions as well as activation functions.

Figure 4:
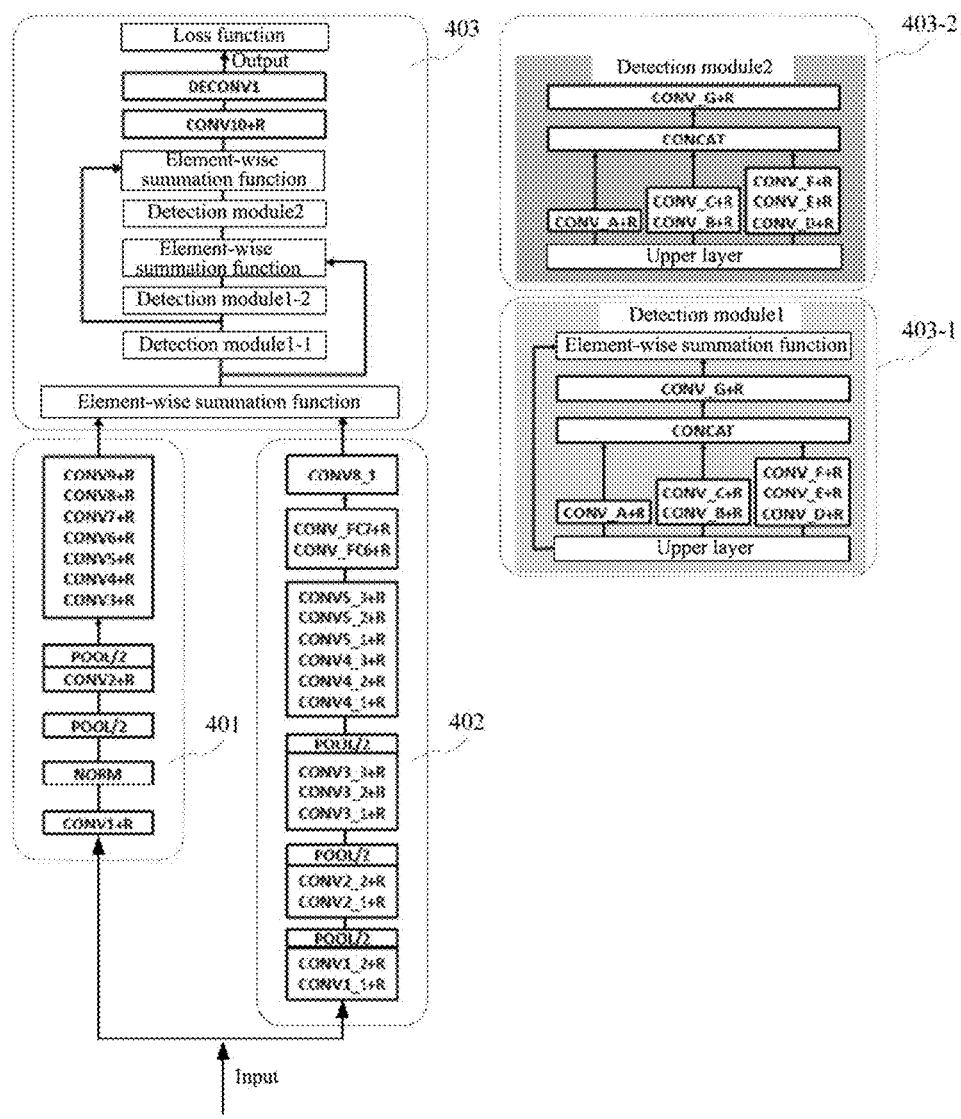
FIG. 4 is a framework diagram of a prediction model according to an embodiment of the present application.

After determining a plurality of processing functions and the preset order executed by each of the processing functions, a framework of the prediction model can be determined, for example, the framework of the prediction model can be depicted in FIG. 4:

FIG. 4 is a framework diagram of a prediction model according to an embodiment of the present application. See FIG. 4, the framework of the prediction model includes module 401, module 402, and module 403, where each module includes a plurality of processing functions respectively. Where, the plurality of functions in module 401 are used for extracting eye fixation information from the original image, the plurality of functions in module 402 are used for extracting semantic description information from the original, and the plurality of functions in module 403 are used for conducting processing on the fused eye fixation information and semantic description information in order to obtain the saliency map.

In the prediction model depicted in FIG. 4, CONV is a convolution function, the number behind CONV (e.g., 1, 1-1, 2-1, A, B, C, etc.) is used to distinguish the convolution functions, +R refers to an activation function following its first former convolution function. NORM is normalization function, POOL/2 is pooling function, DECONV is deconvolution function, and CONCAT is concatenation function.

In the prediction model depicted in FIG. 4, the definition of the discrete convolution operation is depicted as relationship 2:

$$(F*K)(p) = \Sigma_{s+t=p} F(s)k(t)  \quad \text{relationship 3;}$$

Where, $F: Z^2 \to R$ is the discrete convolution function and $\Omega_r: [-r,r]^2 \cap Z^2$ is the definition domain for the discrete convolution operation, k is the discrete filtering function defined on the interval mapping: $\Omega_r \to R$, whose size is $(2r+1)^2$, and * in the function is defined as the discrete convolution operator.

Optionally, the CONV3-3 to CONV8-1 in module 402 of the prediction model can be dilated convolution operation, and the dilated convolution operation can be depicted as relationship 4:

$$(F*_l K)(p) = \Sigma_{s+lt=p} F(s)k(t)  \quad \text{relationship 4;}$$

Where, $*_l$ is define as dilated convolution operator.

Optionally, the CONV9 in the module 401 of the prediction model can be a convolution function which is comprised of 512 convolutional kernels with size of 3*3.

It should be noted that, FIG. 4 shows only the functions included in the prediction model as a form of an example, rather than limiting the functions included in the prediction model. The functions in the prediction model do not be limited specifically in the embodiment of the present application.

S303, initializing each of the processing functions according to preset initial parameters.

For example, according to the prediction model depicted in FIG. 4, each parameters of function in the module 401 can be initialized with the parameters of each function in the pre-trained Deep-Fixation model. Each parameters of function in the module 402 can be initialized with the parameters of each function in the pre-trained VGG16 model. Each parameters of function in the module 403 can be initialized in the manner of Xavier initialization.

S304, processing each of the sample RGB images via the plurality of processing functions successively according to the preset order. More specifically, propagating each of the sample RGB images via the plurality of processing functions successively according to the preset order.

After initializing each function, the initial prediction model is obtained. Then, each of the sample RGB images is taken as input to the initial prediction model to make the sample RGB images are forward processed by the initial prediction model. In particular, each of the sample RGB images can be processed by a plurality of processing functions in accordance with a preset order, and then the predicted saliency map corresponding to each of the sample RGB images can be obtained.

S305, calculating loss value between a predicted saliency map corresponding to the sample RGB and the manually annotated saliency map corresponding to the sample RGB images via a loss function.

After the predicted saliency map corresponding to the sample RGB images is obtained, the loss value between each predicted saliency map and the corresponding manually annotated ground-truth image can be calculated via a loss function.

Optionally, the loss function can be a cross entropy loss function, and the cross entropy loss function can be depicted in relationship 5:

$$L = \Sigma_{i=1}^{N} G_i \log P(S_i=1|I,W) + \Sigma_{i=1}^{N} (1-G_i) \log P(S_i=0|I,W) \quad \text{relationship 5;}$$

Where, G is the manually annotated saliency map; I represents the original image and i represent the pixel index in the saliency map; and N represents the number of pixels in the predicted saliency map and the corresponding manually annotated ground-truth image, respectively. $G_i$ is used for indicating whether the pixel indexed by i in the manually annotated ground-truth image is being salient or not, $G_i=1$ indicates the pixel indexed by i in the manually annotated ground-truth image is being salient, while $G_i=0$ indicates not being salient. W represents the current optimized parameters in the prediction model; $P(S_i|I,W)$ represents the probability of whether the pixel indexed by i in the prediction image being salient.

S306, calculating a partial derivative with reference to the loss function according to the loss value in order to obtain gradient value from the loss function.

S307, processing the gradient value via the plurality of processing functions successively to obtain the optimal parameters for each of the processing functions. More specifically, propagating the gradient values via the plurality of processing functions in the opposite direction as the sample RGB image being processed successively in order to obtain the optimal parameters for the processing functions via optimization.

In S307, gradient value is taken as input and input to the initial prediction model and then propagate it in the opposite direction which is the sample RGB image being processed. In the process of the gradient value being back-propagated through the initial prediction model, conducting the optimization on the parameter of each processing function can be achieved.

S308, determining the prediction model according to each processing functions and the optimal parameter for each processing functions.

After the optimization of the parameters in the processing functions of the prediction model is finished, the final salient object detection model is obtained.

Combing with FIG. 5, the technical solution depicted in the above embodiment is illustrated in detail via a specific embodiment as below.

Figure 5:
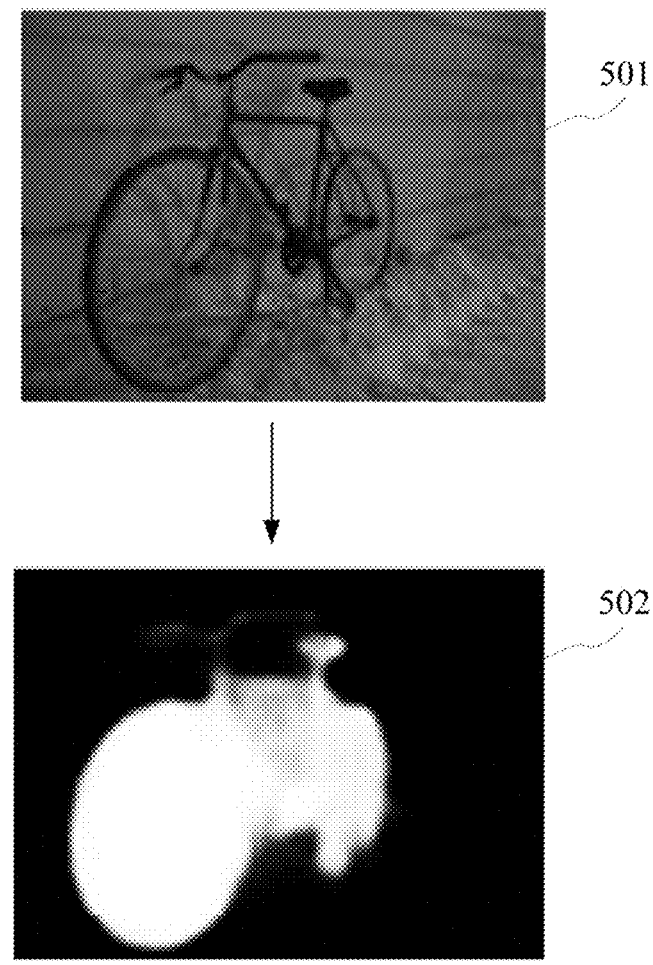
FIG. 5 is a schematic diagram of an original image and an saliency map according to an embodiment of the present application.

FIG. 5 is a schematic diagram of an original image and a predicted saliency map according to an embodiment of the present application. See FIG. 3, which includes the original image 501 and the saliency map 502.

Assuming the prediction model are depicted in FIG. 4, when it is needed to extract the saliency map from the original image 501, the eye fixation information from the original image 501 can be extracted by the eye fixation information extraction module in the prediction model, in particular, the original image 501 being processed by a convolution function CONV1, an activation function, a normalization function NORM, a pooling function POOL/2, a convolution function CONV2, an activation function, a pooling function POOL/2, a convolution function CONV3, an activation function, a convolution function CONV4, an activation function, a convolution function CONV5, an activation function, a convolution function CONV6, an activation function, a convolution function CONV7, an activation function, a convolution function CONV8, an activation function, a convolution function CONV9, and an activation function to process the original image 501. The viewpoint information of the original image 501 can be extracted.

The semantic information of the original image 501 is extracted via the semantic information extraction module in the prediction model, in particular, The original image 501 being processed by a convolution function CONV1-1, an activation function, a convolution function CONV1-2, an activation function, a pooling function POOL/2, a convolution function CONV2-1, an activation function, a convolution function CONV2-2, an activation function, a pooling function POOL/2, a convolution function CONV3-1, an activation function, a convolution function CONV3-2, an activation function, a convolution function CONV3-3, an activation function, a pooling function POOL/2, a convolution function CONV4-1, an activation function, a convolution function CONV4-2, an activation function, a convolution function CONV4-3, an activation function, a convolution function CONV5-1, an activation function, a convolution function CONV5-2, an activation function, a convolution function CONV5-3, an activation function, a convolution function CONV6, an activation function, a convolution function CONV7, an activation function, a convolution function CONV8-1. The semantic description information can be extracted from the original image 501.

Followed by an element-wise summation function, a function in the detection module 1-1, a function in the detection module 1-2, an element-wise summation function, a function in the detection module 2, the element-wise summation function, a convolution function CONV10, an activation function, a deconvolution function DECONV1 function followed by an activation function to conduct processing on the fused eye fixation information and semantic information in order to obtain saliency map 502.

In the practical application process, the saliency map can be evaluated by the two metrics $F_\beta^{max}$ and MAE, respectively. Wherein, $F_\beta$ can be depicted in relationship 6:

$$F_\beta = \frac{(1+\beta)^2 * \text{Precision} * \text{Recall}}{\beta^2 * \text{Precision} + \text{Recall}}; \quad \text{relationship 6}$$

Where, the gray values of the saliency map and the manually annotated image obtained in the present application can be normalized into the interval [0,255]. For any gray values in the interval [0,255], the corresponding Precision and Recall are calculated, Recall and Precision represent precision and recall of the every possible gray value, respectively, and the maximum value of $F_\beta$ is depicted as $F_\beta^{max}$. Where, $\beta^2$ is set to be 0.3 in many previous work to emphasize more on Precision, the higher the metric is, the more accurate the saliency map is obtained by the present application.

MAE can be depicted in relationship 7:

$$MAE = \frac{1}{N}\sum_i^N MAE_{im}^i;\qquad \text{relationship 7}$$

In particular, the gray values in the predicted saliency map and the corresponding manually annotated image obtained in the present application can be normalized into the interval [0, 1] and then the absolute value between the saliency map to be estimated and the manually annotated saliency map is calculated to obtain $MAE_{im}$ from each testing image, and then $MAE_{im}$ of all the images in a testing data set are calculated to obtain the final MAE metric for a salient object detection data set. The smaller the MAE evaluation metric is, the more accurate the saliency map will be obtained by the present application.

Figure 6:
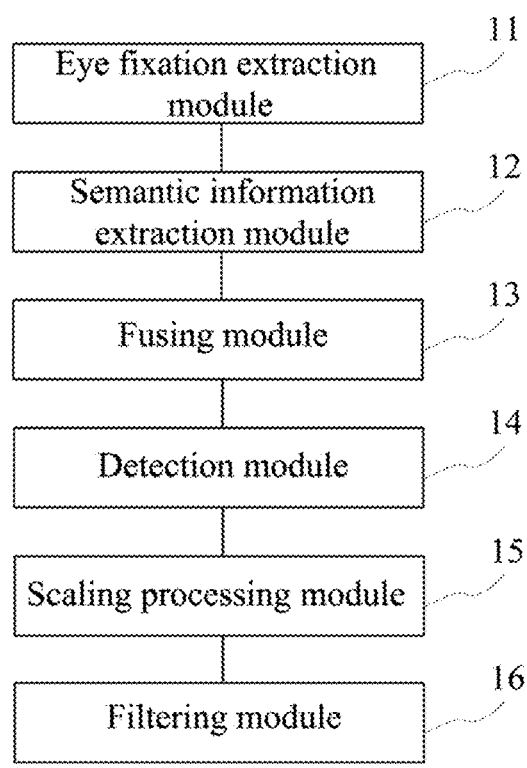
FIG. 6 is a structural diagram 1 of an apparatus for extracting a saliency map according to an embodiment of the present application.

FIG. 6 is a structural diagram 1 of an apparatus for extracting a saliency map according to an embodiment of the present application. See FIG. 6, the apparatus may include an eye fixation extraction module 11, a semantic information extraction module 12, a fusing module 13 and a detection module 14, where, The eye fixation extraction module 11 is configured to conduct first convolution processing, first pooling processing and normalization processing on an original image to obtain eye fixation information from the original image, where the eye fixation information is used for indicating a region at which human eye gaze in the original image;

The semantic information extraction module 12 is configured to conduct second convolution processing and second pooling processing on the original image via the prediction model to obtain semantic description information from the original image; The eye fixation information is used for indicating a region at which human eye gaze.

The fusing module 13 is configured to fuse the eye fixation information and the semantic description information via element-wise summation function.

The detection module 14 is configured to conduct detection processing on the eye fixation information and the semantic description information via the prediction model to obtain saliency map from the original image.

The apparatus for extracting the saliency map provided in the embodiment of the present application can execute the technical solution depicted in the above method embodiment, whose implementation principle and beneficial effect are similar, no more details here.

In one possible embodiment, the detection module 14 is specifically configured to:

Determine the saliency map according to the fused eye fixation and semantic description information extracted from the original image.

Figure 7:
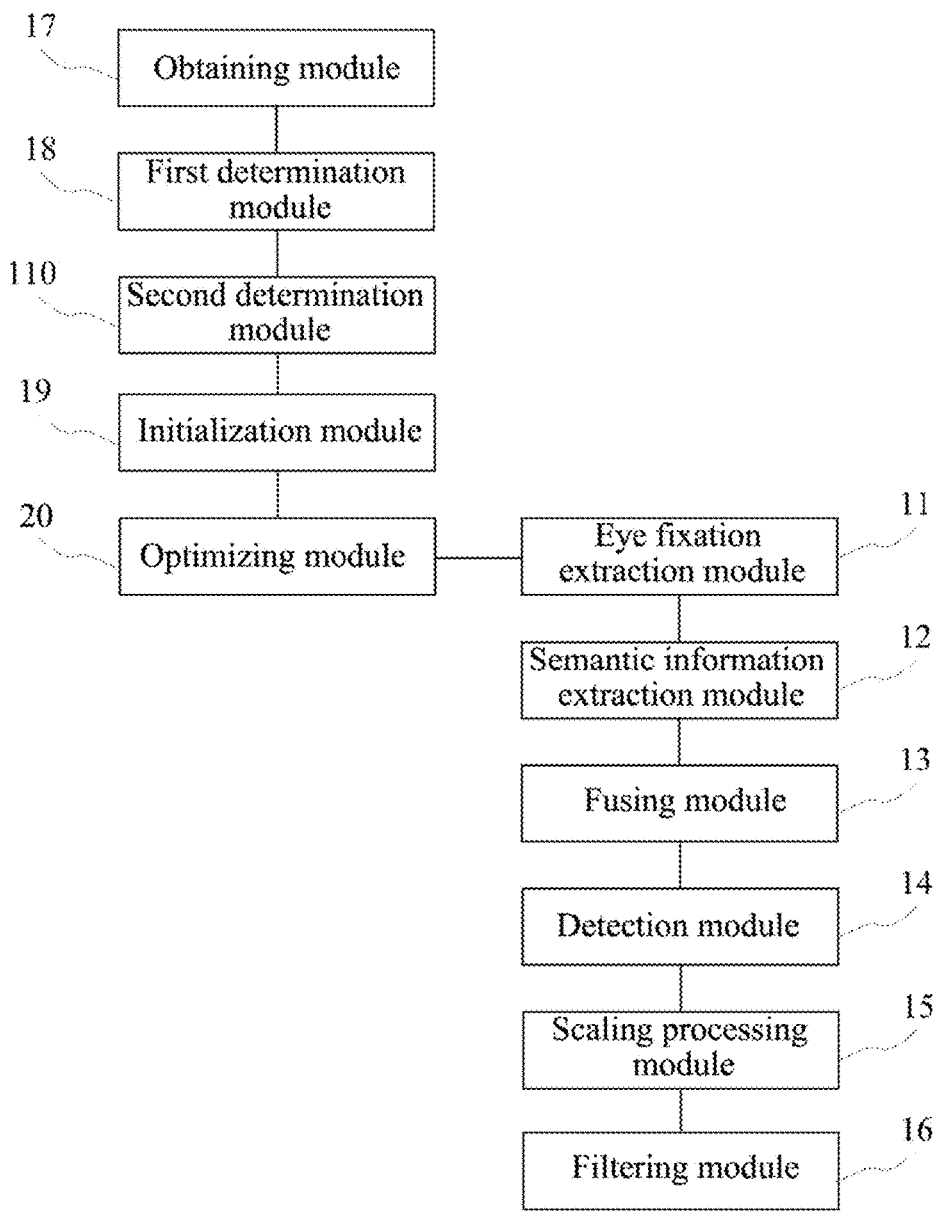
FIG. 7 is a structural diagram 2 of an apparatus for extracting a saliency map according to an embodiment of the present application.

FIG. 7 is a structural diagram 2 of an apparatus for extracting a saliency map according to an embodiment of the present application. On the basis of the embodiment depicted in FIG. 6, see FIG. 7, the apparatus further includes a scaling processing module 15 and a filtering module 16, where, The scaling processing module 15 is configured to conduct scaling processing on the saliency map via bilinear interpolation to make size of the saliency map is the same as size of the original image, after the detection module 14 conducts detection processing on the eye fixation information and the semantic information via the prediction model to obtain the saliency map from the original image; and The filtering module 16 is configured to conduct filtering processing on the saliency map via a Butterworth filter for refinement.

In another possible embodiment, the apparatus further includes an obtaining module 17, a first determination module 18, a second determination module 110, an initialization module 19, an optimizing module 20 and, where, The obtaining module 17 is configured to obtain a plurality of sample RGB images and a manually annotated saliency map corresponding to each of the sample RGB images, prior to the first extraction module 11 conducts the first convolution processing, the first pooling processing and the normalization processing on the original image via the prediction model to obtain eye fixation information of the original image;

The first determination module 18 is configured to determine a plurality of processing functions which are executed in a preset order, where the processing functions include convolution function, pooling function, normalization function, and activation function;

The second determination module 110 is configured to determine the prediction model according to each of the processing functions and the optimal parameters of each of the processing functions.

The initialization module 19 is configured to initialize each of the processing functions according to preset initial parameters; more specifically, the initialization module 19 is configured to initialize the parameters in the prediction model via existing parameters or in the manner of Xavier initialization;

The optimizing module 20 is configured to optimize the preset initial parameters of each of the processing functions via the sample RGB images and each of the manually annotated images to obtain an optimal parameter of each of the processing functions; and In another possible embodiment, the optimizing module 20 is specifically configured Process each of the sample RGB images via the plurality of processing functions successively according to the preset order; More specifically, propagating each of the sample RGB images via the plurality of processing functions successively according to the preset order;

Calculate loss value between a predicted saliency map corresponding to the sample RGB and the manually annotated saliency map corresponding to the sample RGB images via a loss function;

Calculate a partial derivative with reference to the loss function according to the loss value in order to obtain gradient value from the loss function; and Process the each of gradient value through the plurality of processing functions successively to obtain the optimal parameter for each of the processing functions, more specifically, propagate the gradient values via the plurality of processing functions in the opposite direction as the sample RGB image being processed successively to obtain the optimal parameters for the processing functions.

The apparatus for extracting saliency map provided in the embodiment of the present application can execute the technical solution depicted in the above method embodiment, whose implementation principle and beneficial effect are similar, no more details here.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disc.

Finally, it should be noted that the above embodiments are merely provided for describing the technical solutions of the embodiment of the present application, but not intended to limit the present application. It should be understood by persons skilled in the art that although the present application has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from the spirit and scope of the technical solutions of the embodiments of the present application.

What is claimed is:

1. A method for extracting a saliency map, comprising:
conducting first convolution processing, first pooling processing and normalization processing on an original image via the prediction model to obtain eye fixation information from the original image, wherein the eye fixation information is used for indicating a region at which human eye gaze in the original image;
conducting second convolution processing and second pooling processing on the original image via the prediction model to obtain semantic description information from the original image, wherein the semantic description information is used for describing content of the original image;
fusing the eye fixation information and the semantic description information via element-wise summation function; and
conducting detection processing on the fused eye fixation information and semantic description information via the prediction model to obtain a saliency map from the original image.

2. The method according to claim 1, wherein the conducting detection processing on the fused eye fixation information and semantic description information via the prediction model to obtain the saliency map from the original image comprises:
conducting convolution processing and element-wise summation processing as well as deconvolution processing on the fused eye fixation information and semantic information in order to obtain a saliency map from the original image.

3. The method according to claim 1, wherein after the conducting detection processing on the eye fixation information and the semantic information via the prediction model to obtain the saliency map from the original image, the method further comprises:
conducting scaling processing on the saliency map via bilinear interpolation to make a size of the predicted saliency map be the same as a size of the original image; and
conducting filtering processing on the saliency map via a Butterworth filter.

4. The method according to claim 1, wherein prior to the conducting the first convolution processing, the first pooling processing and the normalization processing on the original image via prediction model to obtain eye fixation information from the original image, the method further comprises:
obtaining a plurality of sample RGB images and a manually annotated saliency map corresponding to each of the sample RGB images;
determining a plurality of processing functions which are executed in a preset order, wherein the processing functions consists of convolution functions, pooling functions, normalization functions and activation functions;
initializing each of the processing functions according to a preset initial parameter;
optimizing the preset initial parameter in the processing functions via the sample RGB images and each of the manually annotated saliency map to optimize the parameter in each of the processing functions.

5. The method according to claim 4, wherein the optimizing the preset initial parameter for each of the processing functions via the sample RGB images and each of the manually annotated saliency map corresponding to obtain the optimal parameter for each of the processing functions comprises:
processing each of the sample RGB images via the plurality of processing functions successively according to the preset order;
calculating loss value between a predicted saliency map corresponding to the sample RGB and the manually annotated saliency map corresponding to the sample RGB images via a loss function;
calculating a partial derivative with reference to the loss function according to the loss value to obtain a gradient value of the loss function; and
processing the gradient value via the plurality of processing functions successively to obtain the optimal parameter for each of the processing functions.

6. An apparatus for extracting a saliency map, comprising a processor and a memory having computer instructions stored therein, the processor, when executing the instructions, is configured to:
conduct first convolution processing, first pooling processing and normalization processing on an original image via a prediction model to obtain eye fixation information of the original image, wherein the eye fixation information is used for indicating a region at which human eye gaze in the original image;
conduct second convolution processing and second pooling processing on the original image via the prediction model to obtain semantic description information from the original image, wherein the semantic description information is used for describing content of the original image;
fuse the eye fixation information and the semantic description information via element-wise summation function; and
conduct detection processing on the fused eye fixation information and semantic description information via the prediction model to obtain a saliency map from the original image.

7. The apparatus according to claim 6, wherein the processor is further configured to:
determine the predicted saliency map corresponding to the original image according to the fused eye fixation information and the semantic description information.

8. The apparatus according to claim 6, wherein the processor is further configured to:
  conduct scaling processing on the saliency map via bilinear interpolation to make the size of the saliency map is the same as the size of the original image, after conducting detection processing on the eye fixation information and the semantic information via the prediction model to obtain the saliency map from the original image; and
  conduct filtering processing on the predicted saliency map via a Butterworth filter.

9. The apparatus according to claim 6, wherein the processor is further configured to:
  obtain a plurality of sample RGB images and a manually annotated saliency map corresponding to each of the sample RGB images, prior to conducting the first convolution processing, the first pooling processing and the normalization processing on the original image via the prediction model to obtain eye fixation information from the original image;
  determine a plurality of processing functions which are executed in a preset order, wherein the processing functions consist of convolution functions, pooling functions, normalization functions, and activation functions;
  determine a plurality of processing functions which are executed in a preset order, wherein the processing functions consist of convolution functions, element-wise summation functions and a deconvolution function and activation functions;
  initialize each of the processing functions according to a preset initial parameter; and
  optimize the preset initial parameter in each of the processing functions via the sample RGB images and each of the manually annotated ground-truth image to obtain an optimal parameter for each of the processing functions.

10. The apparatus according to claim 9, wherein the processor is further configured to:
  process each of the sample RGB images via the plurality of processing functions successively according to the preset order;
  calculate loss value between a predicted saliency map corresponding to the sample RGB and the manually annotated saliency map corresponding to the sample RGB images via a loss function;
  calculate a partial derivative with reference to the loss function according to the loss value to obtain gradient value from the loss function; and
  process the gradient value via the plurality of processing functions successively to obtain the optimal parameter for each of the processing functions.

* * * * *